(12) United States Patent
Shinohara et al.

(10) Patent No.: US 9,896,828 B2
(45) Date of Patent: Feb. 20, 2018

(54) DRAIN VALVE DEVICE, WASH WATER TANK DEVICE AND FLUSH TOILET

(71) Applicant: TOTO LTD., Kitakyushu-shi, Fukuoka (JP)

(72) Inventors: Koki Shinohara, Kitakyushu (JP); Hideki Tanimoto, Kitakyushu (JP); Makoto Abe, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 0 days.

(21) Appl. No.: 15/180,354

(22) Filed: Jun. 13, 2016

(65) Prior Publication Data

US 2016/0362881 A1 Dec. 15, 2016

(30) Foreign Application Priority Data

Jun. 15, 2015 (JP) ................. 2015-120210

(51) Int. Cl.
E03D 1/34 (2006.01)
E03D 5/094 (2006.01)
E03D 1/14 (2006.01)

(52) U.S. Cl.
CPC .......... *E03D 1/34* (2013.01); *E03D 1/14* (2013.01); *E03D 1/144* (2013.01); *E03D 5/094* (2013.01)

(58) Field of Classification Search
CPC ....................................................... E03D 1/34
USPC ..................................................... 4/378–384
See application file for complete search history.

(56) References Cited

U.S. PATENT DOCUMENTS

| 4,185,339 A * | 1/1980 | Morales ................. E03D 1/304 |
| | | 4/378 |
| 4,486,906 A * | 12/1984 | Meier .................... E03D 1/142 |
| | | 4/378 |
| 5,195,190 A * | 3/1993 | Nguyen-Huu ........... E03D 1/14 |
| | | 4/378 |
| 5,349,981 A * | 9/1994 | Schmucki .............. E03D 1/142 |
| | | 137/425 |
| 2015/0013058 A1* | 1/2015 | Bucher .................. E03D 9/035 |
| | | 4/378 |

* cited by examiner

*Primary Examiner* — Lori Baker
(74) *Attorney, Agent, or Firm* — Amin, Turocy & Watson LLP

(57) ABSTRACT

A drain valve device includes a valve body and a lift part. The valve body plugs a drain outlet arranged on a bottom surface of a tank. The lift part is configured to lift the valve body. The lift part includes an engagement part. The engagement part engages with the valve body at a first height and releases engagement of the engagement part with the valve body at a second height. The second height is greater than the first height.

14 Claims, 13 Drawing Sheets

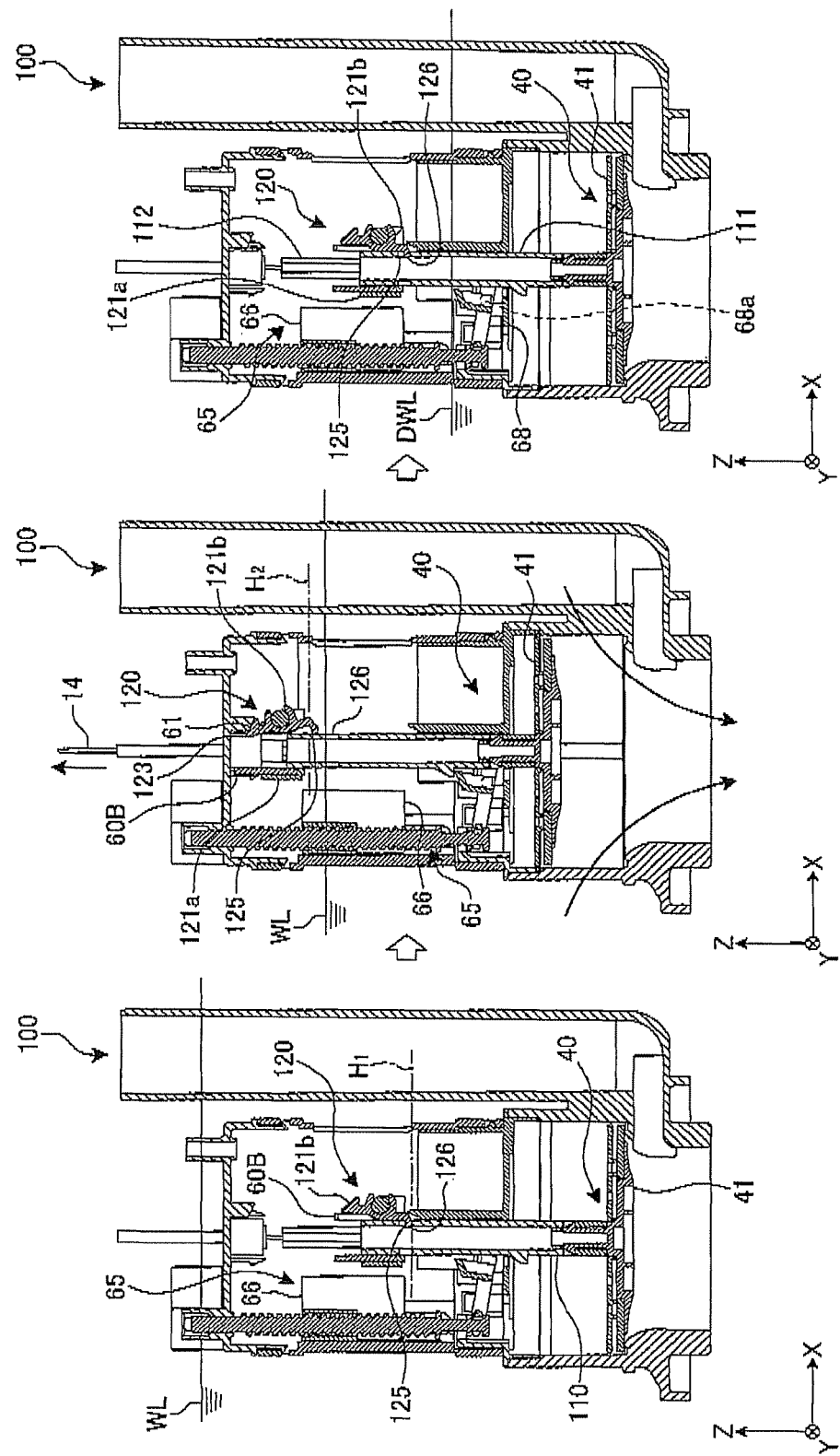

DRAIN VALVE DEVICE, WASH WATER TANK DEVICE AND FLUSH TOILET

CROSS-REFERENCE TO RELATED APPLICATION

The present application claims priority to and incorporates by reference the entire contents of Japanese Patent Application No. 2015-120210 filed in Japan on Jun. 15, 2015.

FIELD

Embodiments of the disclosure relate to a drain valve device, a wash water tank device, and a flush toilet.

BACKGROUND

Conventionally, a drain valve device has been known that is provided in a tank that stores wash water that washes a toilet. Such a drain valve device is such that a valve body that plugs a drain outlet arranged on a bottom surface of the above-mentioned tank is lifted, for example, according to an operation of an operation lever, and thereby, wash water is supplied to a toilet.

A drain valve device may be such that an operation lever is coupled with a valve body by an operation wire and the valve body is lifted according to a rotating operation of the operation lever (see, for example, Japanese Laid-Open Patent Publication No. 2013-100668).

However, in the above-mentioned conventional technique, a valve body remains lifted in a case where an operation time period for an operation lever is long, for example, the operation lever is rotated and held. In such a case, an amount of wash water that is supplied to a toilet is larger than that in a case where an operation time period is short, and hence, there is room for improvement from the viewpoint of water saving.

SUMMARY

It is an object of the present invention to at least partially solve the problems in the conventional technology.

According to an aspect of embodiments, a drain valve device includes a valve body and a lift part. The valve body plugs a drain outlet arranged on a bottom surface of a wash water tank. The lift part is configured to lift the valve body. The lift part includes an engagement part. The engagement part engages with the valve body at a first height and releases engagement of the engagement part with the valve body at a second height. The second height is greater than the first height.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 15 is a diagram illustrating an operation of a drain valve device according to the second embodiment.

DESCRIPTION OF EMBODIMENTS

Hereinafter, embodiments of a drain valve device, a wash water tank device, and a flush toilet disclosed in the present application will be described in detail, with reference to the accompanying drawings. This invention is not limited to embodiments described below.

Figure 1:
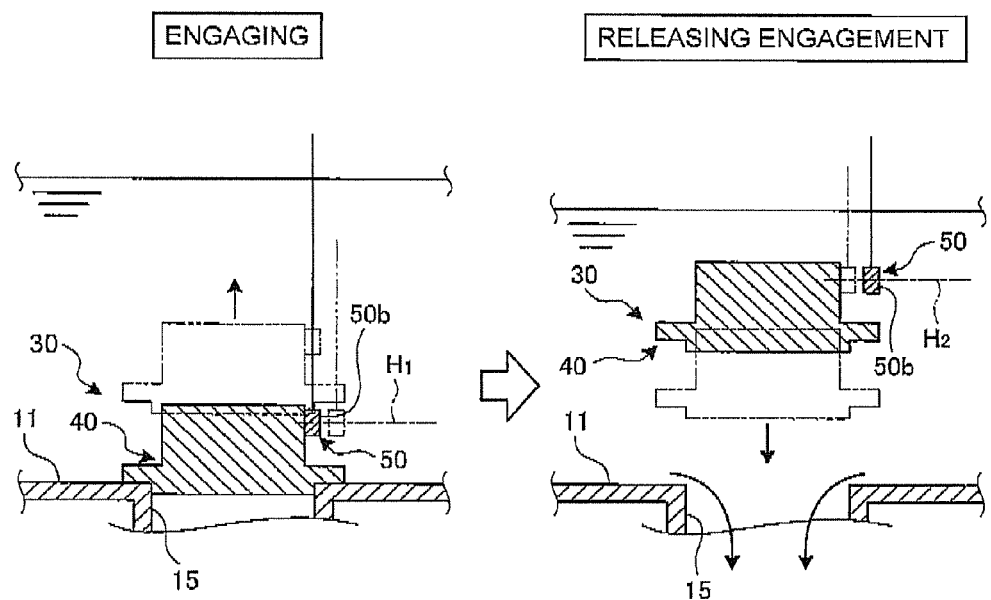
FIG. 1 is a diagram illustrating an outline of a drain valve device according to embodiments.

FIG. 1 is a schematic diagram illustrating a drain valve device 30 according to embodiments. In FIG. 1, a state of "ENGAGING" of an engagement part 50b that will be described later in an inside of a water wash tank 11 that will also be described later is illustrated at a left side of the drawing and a state of "RELEASING ENGAGEMENT" of the engagement part 50b is illustrated at a right side of the drawing.

As illustrated in FIG. 1, the drain valve device 30 includes a valve body 40 and a lift part 50. The valve body 40 plugs a drain outlet 15 arranged on a bottom surface of a tank (wash water tank) 11 that stores wash water that washes a toilet. The lift part 50 lifts the valve body 40 in order to open the drain outlet 15.

For a conventional drain valve device, for example, in a case where an operation time period for an operation lever is long, a period of time when the drain outlet 15 is open is long, and hence, an amount of was water that is supplied to a toilet is more than that in a case where an operation time period is short. In particular, in a case of a 3.8 L wash toilet that has spread on a trend of water saving, it is difficult to exert an effect of water saving of a 3.8 L wash sufficiently unless an operation is executed for a short period of time of 0.5 seconds.

In the drain valve device 30 according to an embodiment, the lift part 50 is provided with an engagement part 50b that engages with the valve body 40 that has closed or plugged the drain outlet 15 at a first height $H_3$ and releases its engagement with the valve body 40 at a second height $H_2$ that is greater than the first height $H_1$. That is, the valve body 40 lifted by the lift part 50 separates from the lift part 50 at the second height $H_2$, and hence, becomes independent of an operation of an operation lever.

Therefore, due to the drain valve device 30 according to an embodiment, the valve body 40 can be moved upward or downward regardless of whether an operation time period for an operation lever is long or short. Thereby, a period of time when the drain outlet 15 is open can be constant and water can be saved independently of an operation time period.

Although the engagement part 50b of the lift part 50 is illustrated in FIG. 1 in such a manner that it is shifted in a leftward or rightward direction in the drawing, it is a convenient illustration to facilitate understanding of explanation of engaging and releasing engagement and such a shift is not necessarily needed. An expression of "engagement" for the engagement part 50b or the like includes not only a case where both of them are hooked by each other, but also a case where both of them are attracted to each other like magnets.

First Embodiment

Figure 2:
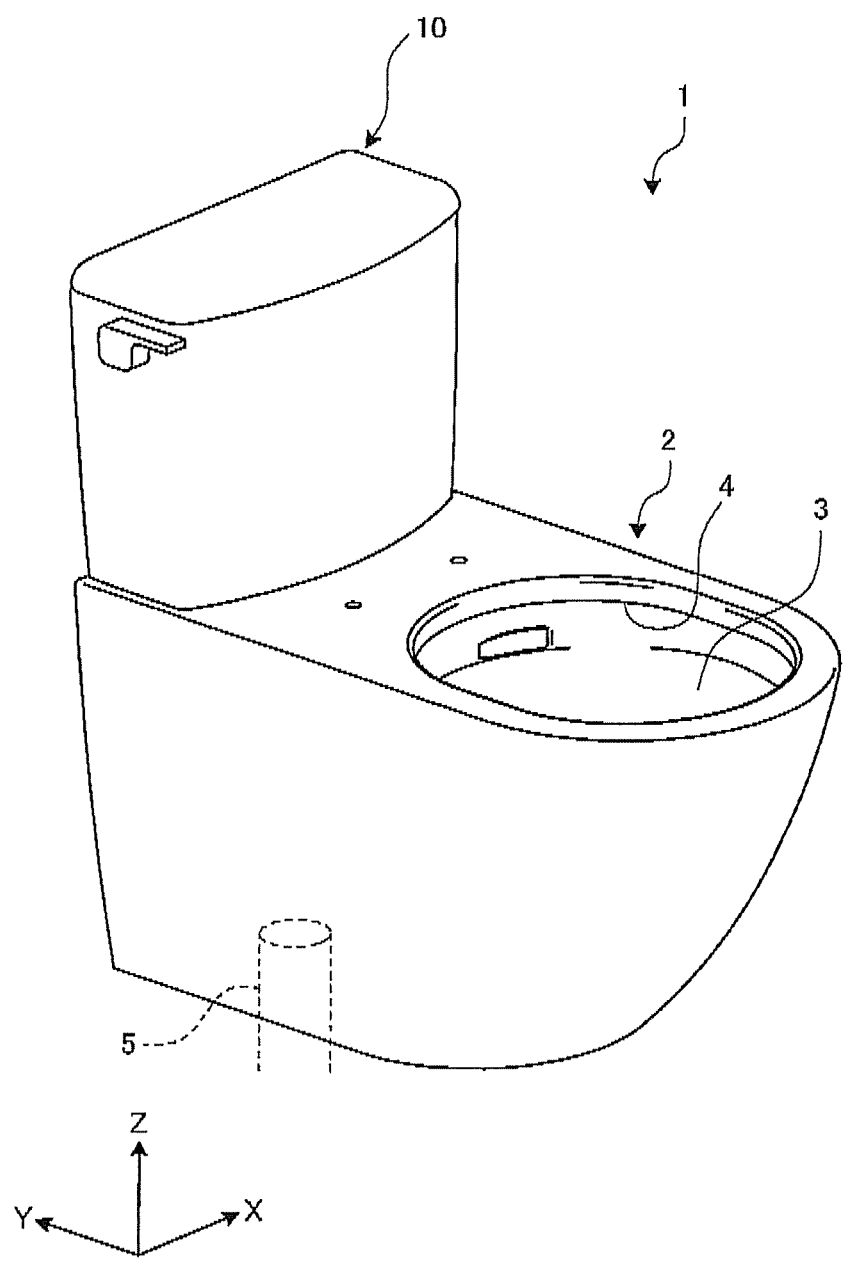
FIG. 2 is a schematic perspective view of a flush toilet according to a first embodiment.

Hereinafter, a drain valve device 30, a wash water tank device 10, and a flush toilet 1 according to a first embodiment will be described in detail, with reference to FIG. 2 to FIG. 12. First, an entire configuration of the flush toilet 1 according to the first embodiment will be described with reference to FIG. 2. FIG. 2 is a schematic perspective view of the flush toilet 1 according to the first embodiment.

FIG. 2 illustrates a three-dimensional orthogonal coordinate system that includes a Z-axis where a vertical upward direction is a positive direction, to facilitate understanding of an explanation. Such an orthogonal coordinate system may also be illustrated in other drawings that will be used in the following descriptions. Hereinafter, a positive direction of a Y-axis is defined as a direction of a front view, and further, a positive direction of an X-axis, a negative direction of the X-axis, and a negative direction of the Z-axis are defined as a direction of a right side view, a direction of a left side view, and a direction of a plan (top) view, respectively.

As illustrated in FIG. 2, the flush toilet 1 according to the first embodiment includes a toilet body. 2 that is mounted on a floor surface of a toilet room and the wash water tank device 10 that is mounted on a top of the toilet body 2 and stores wash water that is used for the toilet body 2. The toilet body 2 is not limited to a floor-mounted type but may be a wall-mounted type.

The toilet body 2 includes a bowl part 3 that receives sewage, a headrace (not illustrated) that guides, to the bowl part 3, wash water that is supplied from the wash water tank device 10, and a drainage water trap pipeline (not illustrated) that has an inlet connected to a bottom of the bowl part 3 and discharges sewage in the bowl part 3 to a drain pipe 5 that will be described later. The toilet body 2 is made of, for example, a ceramic.

The bowl part 3 includes a rim part 4 that overhangs inward on an upper edge part thereof, a first water ejection port (not illustrated) that is provided on the rim part 4 and ejects wash water that is supplied from a headrace, and a second water ejection port (not illustrated) that is provided at a position above a accumulated water surface and ejects wash water that flows through the headrace.

The drainage water trap pipeline includes an upward channel portion that extends upward from a pipeline inlet and a downward channel portion that extends downward from an end of the upward channel portion and is connected to the drain pipe 5 that is distributed under a floor or the like of a toilet room. Wash water for forming a state of water sealing is stored from the bowl part 3 to the upward channel portion of the drainage water trap pipeline. Stored wash water is referred to as "accumulated water" and a water surface of accumulated water is the above-mentioned accumulated water surface.

The flush toilet 1 is a so-called siphon type that utilizes a siphon effect to draw sewage in the bowl part 3 and discharge it through the drainage water trap pipeline. In the flush toilet 1, wash water ejected from the first water ejection port turns and falls to wash the bowl part 3. In the flush toilet 1, wash water ejected from the second water ejection port generates a water flow.

The above-mentioned flush toilet 1 is not limited to a siphon type but may be, for example, a so-called wash-down type that washes out sewage due to an action of running water that is causes by a fall of wash water in the bowl part 3 or may be another type flush toilet.

Figure 3:
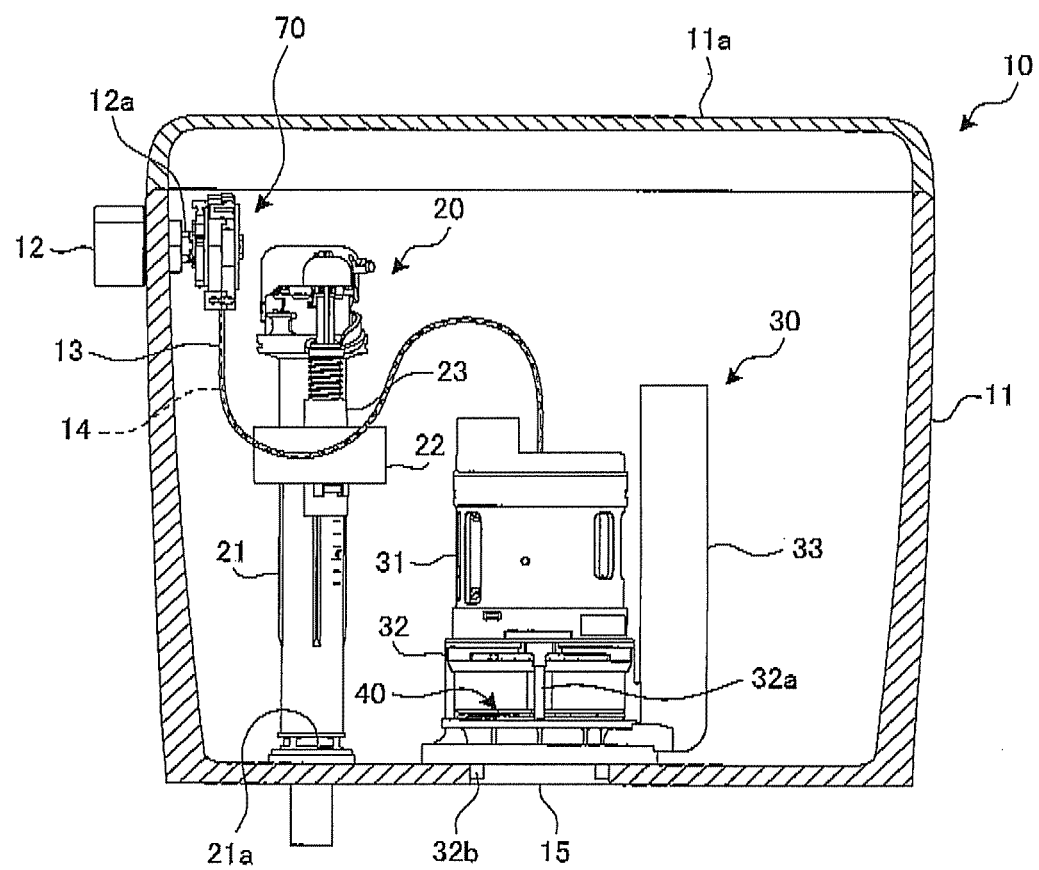
FIG. 3 is a schematic front cross-sectional view illustrating an inside of a wash water tank device according to the first embodiment.

Next, the wash water tank device 10 according to the first embodiment will be described with reference to FIG. 3. FIG. 3 is a schematic front cross-sectional view illustrating an inside of the wash water tank device 10 according to the first embodiment. FIG. 3 illustrates only an X-Z cross section of a wash water tank 11 of the wash water tank device 10 that will be described later.

As illustrated in FIG. 3, the wash water tank device 10 according to the first embodiment includes a wash water tank 11 that stores wash water (that will simply be referred to as a "tank" below), a water supply device 20 provided in the tank 11, the drain valve device 30, an operation part 12, and a wire winding device 70 that cooperates with an operation of the operation part 12.

The tank 11 is made of, for example, a ceramic, and is an open-top and substantially rectangular container. An opening on a top of the tank 11 is closed or plugged by a lid 11a made of a ceramic.

An operation lever handle (that will simply be referred to as an "operation lever" below) as the operation part 12 is provided on an outer side surface of the tank 11. The operation lever 12 rotates around a rotation shaft 12a, for example, from a front side to a back side of the drawing. The operation lever 12 is cooperably coupled with the wire winding device 70 that is provided on an inner side surface of the tank 11 and will be described later, through the rotation shaft 12a.

A tube 13 with an arbitrarily changeable distribution shape (substantially S-shape in the same drawing) is provided between the wire winding device 70 and the drain valve device 30. An operation wire 14 that is moved forward or backward according to an operation of the operation lever 12 is inserted through the tube 13. The operation wire 14 has one end that is attached to the wire winding device 70 and the other end that is connected to a lift part 50 (see FIG. 4) of the drain valve device 30 that will be described later. The wire winding device 70 will be described later, by using FIG. 9.

A drain outlet 15 that communicates with a headrace of the above-mentioned toilet body 2 (see FIG. 2) and supplies wash water to the headrace is provided on a bottom surface of the tank 11. The drain outlet 15 is opened or closed by the valve body 40 of the drain valve device 30.

As illustrated in FIG. 3, the water supply device 20 is provided in the tank 11. The water supply device 20 includes a water supply pipe 21, a small tank 22, and a float for water supply 23. The water supply pipe 21 is connected to a water supply source (not illustrated) outside the tank 11 and extends upward from a bottom surface of the tank 11. A water supply inlet 21a for supplying wash water into the tank 11 is provided on a bottom of the water supply pipe 21.

A water supply valve (not illustrated) is provided on a top of the water supply pipe 21. The water supply valve is, for example, a diaphragm type and switches between supplying of wash water that is supplied from the water supply pipe 21 into the tank 11 and stopping of the water.

The small tank 22 is a substantially rectangular container and is provided attachably to and detachably from a side of the water supply pipe 21. The small tank 22 is provided with a check valve (not illustrated) that opens or closes an opening (not illustrated) provided on a bottom surface thereof. The float for water supply 23 is arranged in the small tank 22 and moves upward or downward depending on a water level in the small tank 22.

The float for water supply 23 is connected to the above-mentioned water supply valve through a swing body or the like and opens or closes the water supply valve due to upward or downward movement thereof. Specifically, as wash water stored in the small tank 22 is drained through an opening (not illustrated), the float for water supply 23 falls according to a water level in the small tank 22. As the float for water supply 23 falls, the water supply valve is opened to supply wash water into the tank 11 through the water supply inlet 21a.

Next, the drain valve device 30 according to the first embodiment will be described. The drain valve device 30 according to the first embodiment is arranged above the drain outlet 15 and is a so-called straight movement type where a lid part 41 of the valve body 40 that will be described later moves upward or downward to open or close the drain outlet 15. As illustrated in FIG. 3, the drain valve device 30 includes a body 31, a mount 32, and an overflow pipe 33.

The body 31 and the mount 32 are provided to be arranged in upward and downward directions and arranged substantially directly above the drain outlet 15. The mount 32 includes a plurality of post parts 32a that are concentrically arranged with respect to a center of the drain outlet 15 at a predetermined space. The mount 32 is attached to the drain outlet 15 in such a manner that a cylindrical connection part 32b provided on a bottom thereof is screwed together with the drain outlet 15. A drain space that communicates with the drain outlet 15 is formed on a bottom of the mount 32.

The overflow pipe 33 is formed into a cylindrical shape with an upper end opening that is directed upward, and is provided integrally with the mount 32 on a side of the mount 32. A lower end opening of the overflow pipe 33 is an opening in a direction that is substantially orthogonal to that of the upper end opening, and communicates with the drain space. The overflow pipe 33 is provided to prevent wash water from overflowing from the tank 11, and drains, to the drain outlet 15, wash water that has a height greater than that of the upper end opening of the overflow pipe 33 and flows into the overflow pipe 33.

Figure 4:
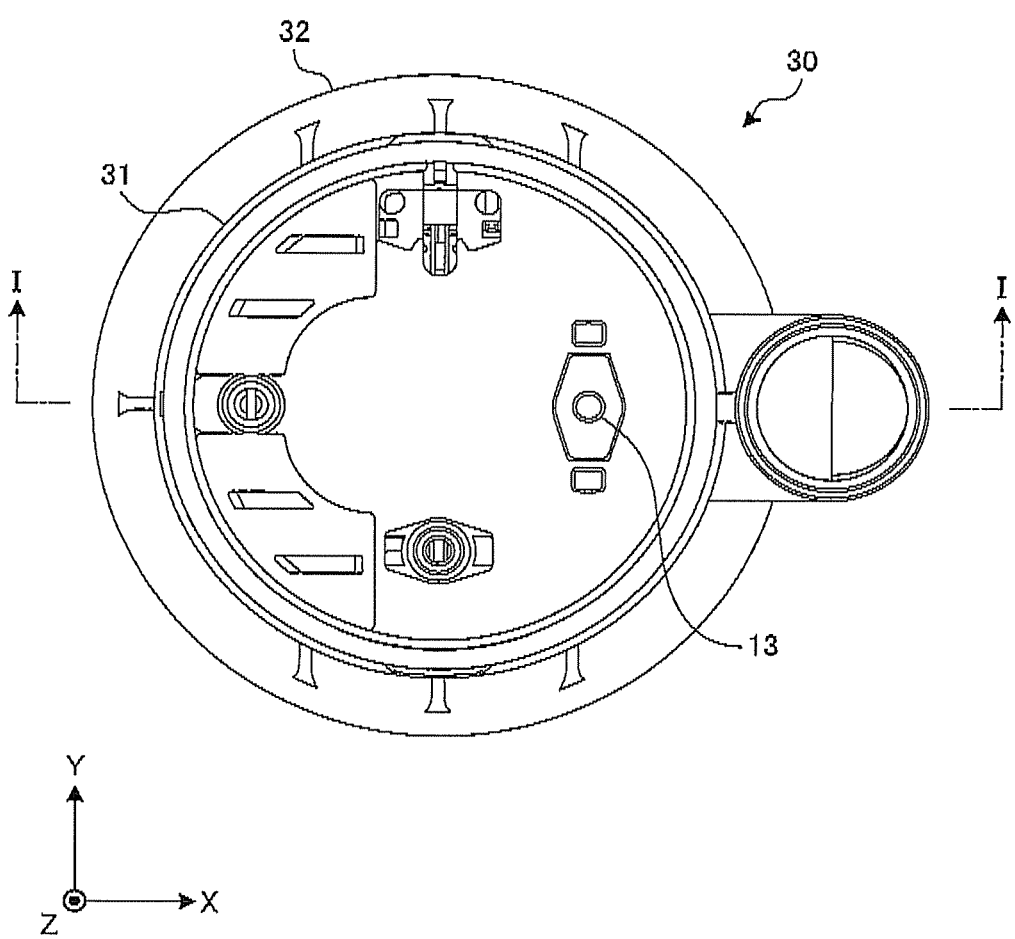
FIG. 4 is a schematic plan view of a drain valve device according to the first embodiment.
Figure 5:
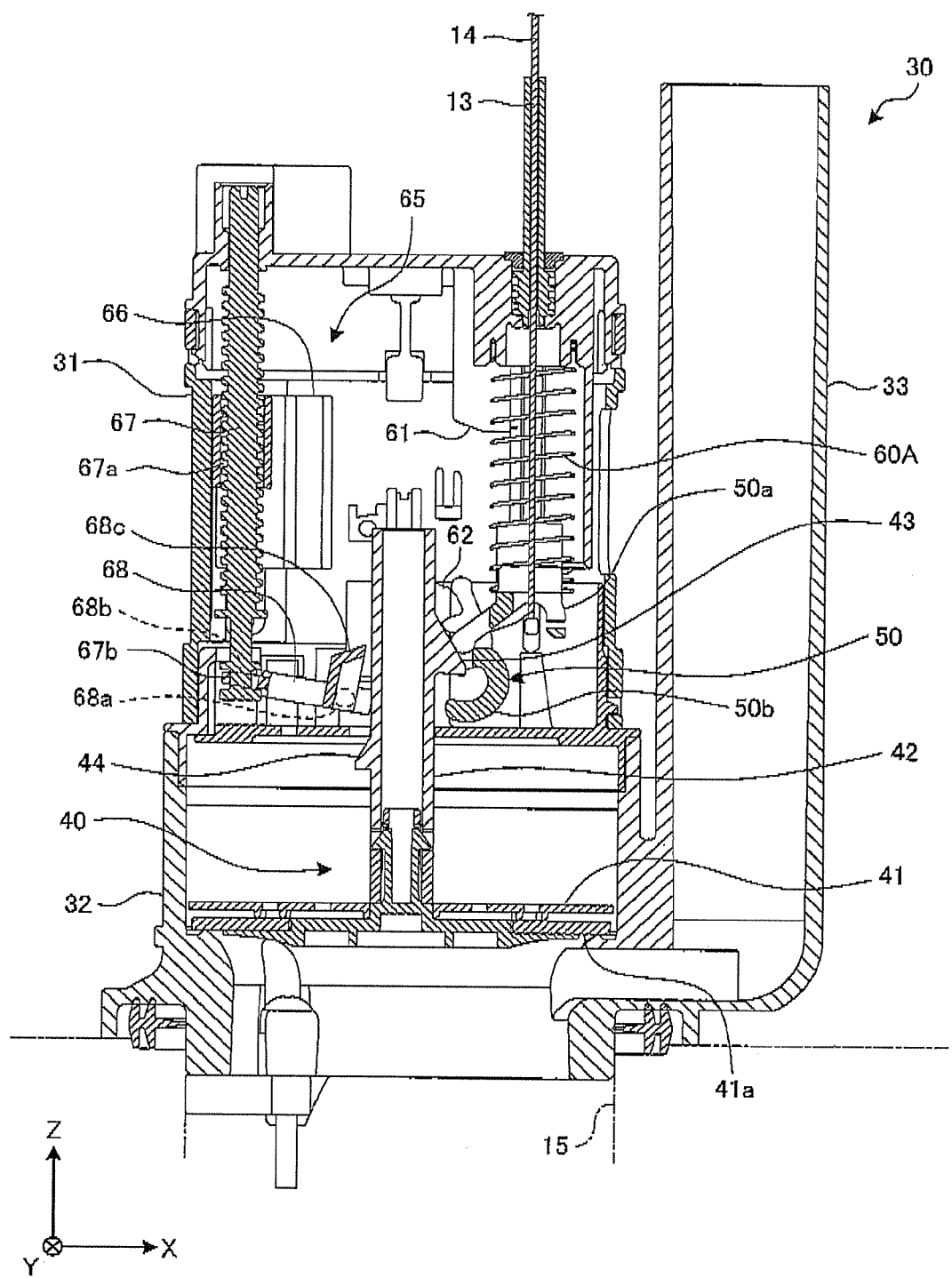
FIG. 5 is a schematic front cross-sectional view of a drain valve device according to the first embodiment.
Figure 6:
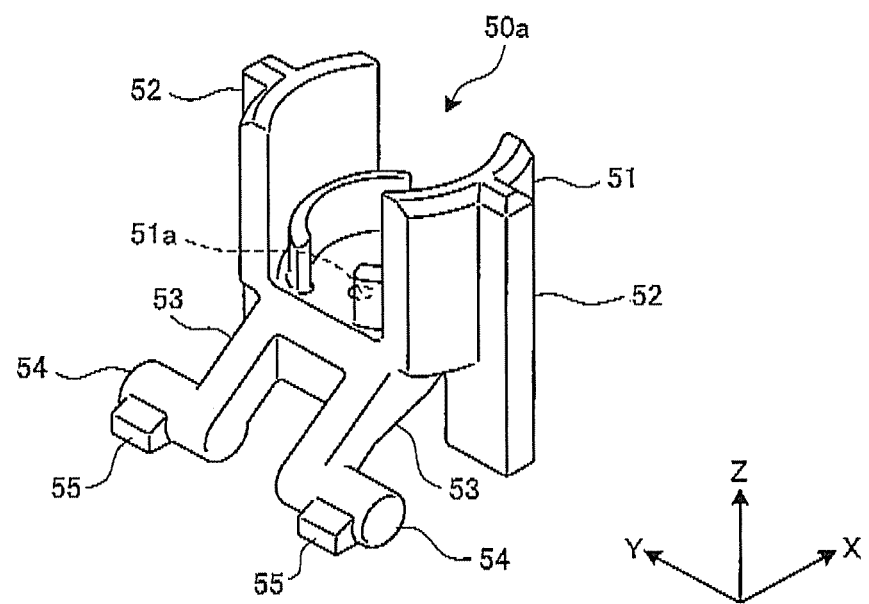
FIG. 6 is a schematic perspective view of a straight movement part.
Figure 7:
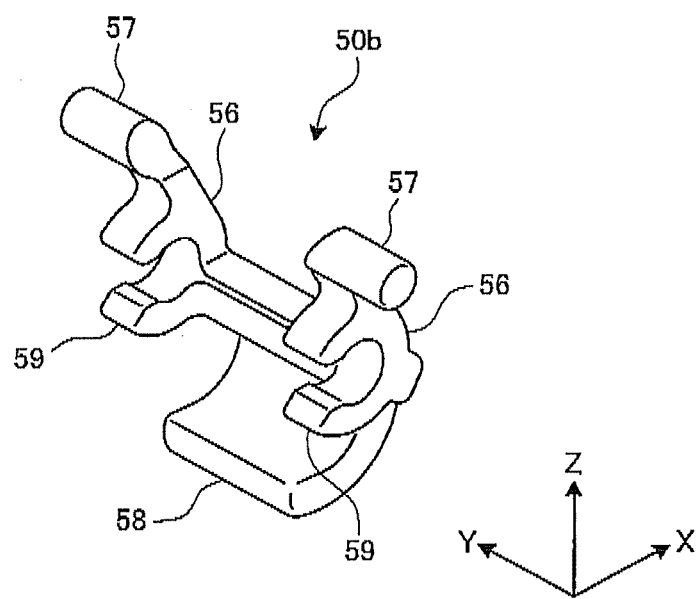
FIG. 7 is a schematic perspective view of an engagement part.
Figure 8:
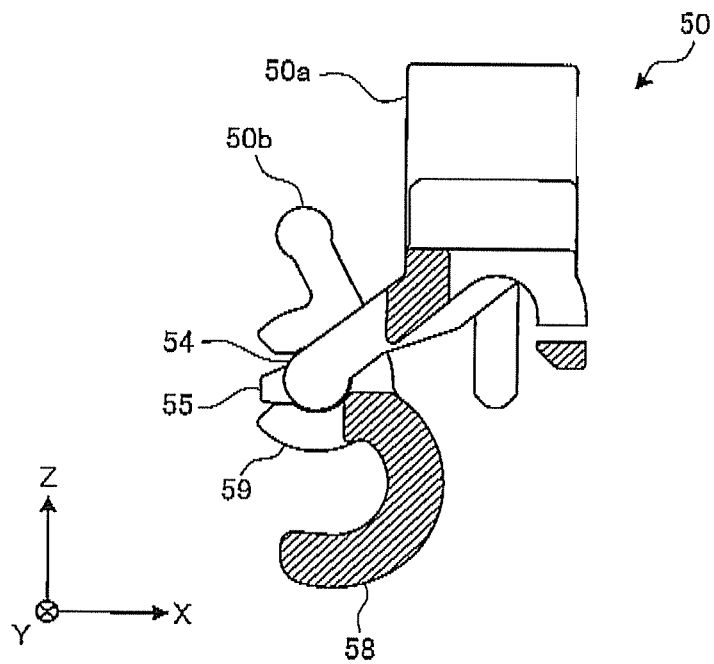
FIG. 8 is a front end view of an assembly of a straight movement part and an engagement part.

Hereinafter, the drain valve device 30 will be described in detail with reference to FIG. 4 to FIG. 11. FIG. 4 is a schematic plan view of the drain valve device 30 according to the first embodiment. FIG. 5 is a schematic front cross-sectional diagram of the drain valve device 30 according to the first embodiment. FIG. 5 is a cross-sectional diagram along a line I-I in FIG. 4. FIG. 6 is a schematic perspective view of a straight movement part 50a. FIG. 7 is a schematic perspective view of an engagement part 50b. FIG. 8 is a front end view of an assembly of the straight movement part 50a and the engagement part 50b.

As illustrated in FIG. 4, in the drain valve device 30 according to the first embodiment, the body 31 is formed into a cylindrical shape and substantially concentrically provided above the mount 32 that is also formed into a cylindrical shape. The tube 13 that connects the drain valve device 30 and the wire winding device 70 is attached to a top surface of the body 31.

As illustrated in FIG. 5, the drain valve device 30 includes the valve body 40, the lift part 50, and a float 65 in the body 31. The valve body 40 includes a lid part 41 and a shaft part 42. The lid part 41 is formed into a disc shape and has, for example, a seal part 41a made of a rubber on a surface opposite to the drain outlet 15. The lid part 41 is provided to be movable upward or downward within a predetermined movable range inside the mount 32 and closes or plugs the drain outlet 15 at a lowest position in the movable range.

The shaft part 42 is formed to have a diameter smaller than that of the lid part 41, formed into a substantially rectangular shaft shape, and extends upward from the lid part 41. The shaft part 42 is provided to be movable upward or downward inside the body 31, and the shaft part 42 moves upward or downward so that the lid part 41 moves upward or downward inside the mount 32. Each of protrusions toward the lift part 50 and the float 65 (lift part side protrusion 43 and float side protrusion 44) is provided on a peripheral surface of the shaft part 42.

The lift part side protrusion 43 has a slide surface with a downward slope that is lower as it becomes distant from the shaft part 42, that is, as it becomes close to a positive direction of an X-axis. A width of such a slide surface in a direction of a Y-axis is less than a distance between a pair of arm parts 53, 53 (see FIG. 6) in the lift part 50 described later to avoid contact with the lift part 50. The float side protrusion 44 is provided on a surface at an opposite side of the lift part side protrusion 43 and has a slide surface with a downward slope that is lower as it becomes distant from the shaft part 42, that is, it becomes close to a negative direction of an X-axis.

The lift part 50 is provided at one side inside the body 31 and connected to the operation wire 14 that extends from the wire winding device 70 (see FIG. 3), so as to move upward or downward according to forward or backward movement of the operation wire 14. The lift part 50 includes a straight movement part 50a and an engagement part 50b. The straight movement part 50a is provided so as to be straight movable in upward and downward directions. The lift part 50 is arranged side by side with the shaft part 42 of the valve body 40 in a top view (view along a negative direction of a Z-axis). As the lift part 50 is lifted, the engagement part 50b engages with the lift part side protrusion 43 of the shaft part 42.

According to such a configuration, the lift part 50 is arranged side by side with the shaft part 42 of the valve body 40, so that, for example, an additional mechanism that acts on the lift part 50, such as a bias part 60A that biases the lift part 50 and will be described later, can readily be arranged.

The engagement part 50b is supported by the straight movement part 50a so as to be rotatable about a rotation shaft 54 (see FIG. 6) in a horizontal direction, namely, a direction of a Y-axis. A detailed shape of the lift part 50 (straight movement part 50a and engagement part 50b) will be described later, by using FIG. 6 to FIG. 8.

The drain valve device 30 includes the bias part 60A that biases the lift part 50 in a downward direction. In the first embodiment, a spring is employed as the bias part 60A. Due to the bias part 60A, the lift part 50 can be lowered reliably even when a sliding resistance or the like is caused at a time of falling of the lift part 50.

Inside the body 31, the float 65 is provided at the other side that is opposite to the lift part 50 through the valve body 40 (shaft part 42). The float 65 includes a float body 66, a float adjusting part 67, and a float side engagement part 68. The float body 66 is formed into, for example, a hollow cylindrical shape. The float adjusting part 67 extends upward and downward and the float body 66 is attached thereto. A groove for adjustment 67a for adjusting a position of attachment of the float body 66 in an upward or downward direction is provided on a peripheral surface of the float adjusting part 67.

As a water level in the tank 11 (see FIG. 3) is lowered to reach a predetermined height, the float body 66 falls according to subsequent lowering of the water level. Timing of falling of the float body 66 can be changed depending on a position of its attachment to the float adjusting part 67. Thus, timing of falling of the float body 66 is variable, so that an amount of wash water that is discharged through the drain outlet 15 (see FIG. 3) can be changed.

An attachment part 67b with the float side engagement part 68 that engages with the valve body 40 being attached thereto is provided on a lower end of the float adjusting part 67. The float side engagement part 68 is swingably provided around a swing shaft 68a in a horizontal direction, namely, a direction of a Y-axis. Thereby, the float body 66 and the float adjusting part 67 swing in upward and downward directions within a predetermined range of a swing thereof, according to a swing of the float side engagement part 68.

The float side engagement part 68 includes the above-mentioned swing shaft 68a, a ring-shaped part 68b, and a push-up part 68c. The ring-shaped part 68b is attached to the attachment part 67b of the float adjusting part 67. The push-up part 68c has a substantially rectangular block shape and forms a concave portion on its surface that is opposite to the shaft part 42 in a state where the float side engagement part 68 is placed.

The push-up part 68c is provided so as to protrude upward. As the float side engagement part 68 swings around the swing shaft 68a as a center so that one end rises that is present at a shaft part 42 side, the push-up part 68c passes the float side protrusion 44 through the above-mentioned concave portion in a direction of a Y-axis. As the other end rises that is present at a float adjusting part 67 side, the one end falls and an upper end of the push-up part 68c contacts the float side protrusion 44. Thereby, the float 65 engages with the shaft part 42 so that buoyancy can be applied to falling of the shaft part 42.

The body 31 includes, inside thereof, an upper guide 61 with a downward slope that protrudes downward from a top surface side and is lower as it becomes distant from the shaft part 42, that is, it becomes close to a positive direction of an X-axis. The upper guide 61 may protrude downward from a top surface of the drain valve device 30. The upper guide 61 may have an end face that is sloped. The sloped end face may be constructed such that an outer end of the sloped end face with respect to an axis of the shaft part 42 of the valve body 40 is lower than an inner end of the sloped end face with respect to an axis of the shaft part 42 of the valve body 40. The upper guide 61 has a surface that is directed downward and contacts the engagement part 50b that rises to lift the valve body 40.

The body 31 includes, inside thereof, a lower guide 62 with a downward slope that protrudes upward from a bottom surface side and is lower as it becomes distant from the shaft part 42, that is, it becomes close to a positive direction of an X-axis. The lower guide 62 has a surface that is directed upward and contacts the engagement part 50b that falls thereon.

Herein, the lift part 50 (straight movement part 50a and engagement part 50b) will be described in detail with reference to FIG. 6 to FIG. 8. As illustrated in FIG. 6, the straight movement part 50a includes a trunk part 51, a pair of guide parts 52, 52, a pair of arm parts 53, 53, a pair of rotation shafts 54, 54, and a pair of rotation regulating parts 55, 55. The trunk part 51 is formed into a cylindrical shape with a cut portion and a spring (see FIG. 5) as the bias part 60A is attached thereto. The straight movement part 50a may have rotation shafts 54, 54 with a horizontal axis and supports the engagement part 50b with the rotation shafts 54, 54. The engagement part 50b may be rotatable around the rotation shafts 54, 54 of the straight movement part 50a.

For connection of the operation wire 14, an insertion through-hole 51a for inserting the operation wire 14 therethrough is provided on a bottom surface of the trunk part 51. The pair of guide parts 52, 52 are formed into substantially rectangular block shapes that extend in upward and downward directions (directions of a Z-axis), and both provided on an outer peripheral surface of the trunk part 51.

The pair of arm parts 53, 53 are both provided so as to protrude from the trunk part 51 in a negative direction of an X-axis. The rotation shaft 54 is provided on end portions of the pair of arm parts 53, 53 so as to be parallel to a Y-axis. The rotation regulating part 55 is provided so as to protrude from the pair of rotation shafts 54, 54 in a negative direction of an X-axis.

As illustrated in FIG. 7, the engagement part 50b includes a base part 56 and a claw part 58. The base part 56 is formed into a bar shape in a view along a rotation axis (view in a direction of a Y-axis). The base part 56 includes a pair of contact parts 57, 57 and a pair of grip parts 59, 59 on both ends thereof in a view along a direction of an X-axis. Each of the pair of contact parts 57, 57 is formed into a cylindrical shape with a central axis that is directed in a direction of a Y-axis.

Each of the pair of grip parts 59, 59 is provided between the base part 56 and the claw part 58, and formed into a shape with an open part in a view along a rotation shaft. In the illustrated example, the grip part 59 is formed into a substantially C-shape. The claw part 58 forms one end of the engagement part 50b and is formed into a hook shape that is curved to a negative direction of an X-axis. The above-mentioned base part 56 forms the other end of the engagement part 50b.

As illustrated in FIG. 8, the lift part 50 inserts the rotation shafts 54 of the straight movement part 50a through the grip parts 59 of the engagement part 50b, and thereby, the engagement part 50b is rotatably supported by the straight movement part 50a. Open edge portions of the grip parts 59 are regulated by the rotation regulating parts 55 of the straight movement part 50a so that the engagement part 50b is rotatable within a predetermined range. The engagement part 50b supported by the straight movement part 50a has a center of gravity at a position where it has an orientation (that will be referred to as a "reference orientation" below) such that the claw part 58 is present under the rotation shaft 54 and closer to the shaft part 42 than a tip of the protrusion 43 of the shaft part 42

Thus, in a state where the engagement part 50b is supported by the straight movement part 50a, it has a center of gravity at a position where the claw part 58 has the above-mentioned reference orientation, and thereby, the engagement part 50b can reliably be engaged with the shaft part 42 of the valve body 40.

Figure 9:
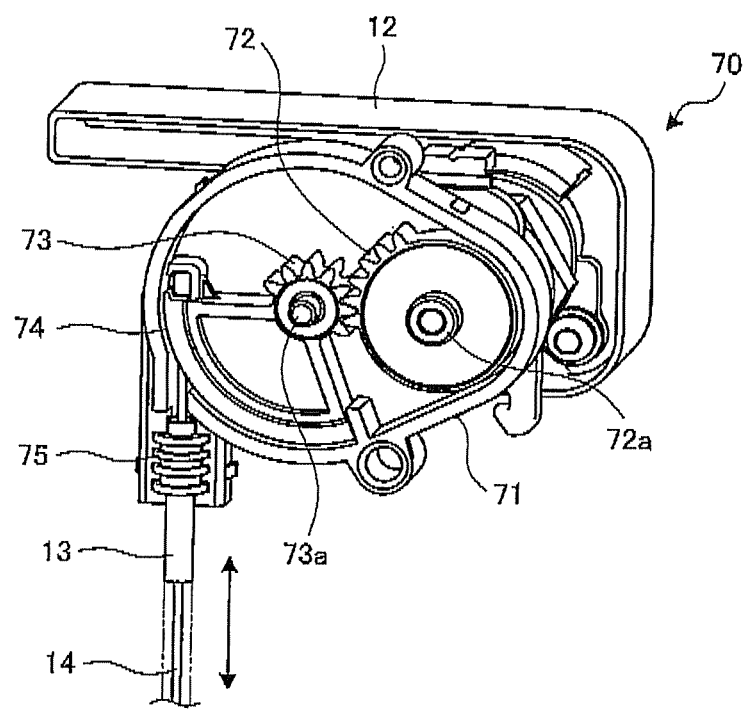
FIG. 9 is a schematic perspective view of a wire winding device.

Next, the wire winding device 70 will be described with reference to FIG. 9. FIG. 9 is a schematic perspective view of the wire winding device 70. As mentioned above, the wire winding device 70 moves the operation wire 14 forward or backward. As illustrated in FIG. 9, the wire winding device 70 is coupled with the operation lever 12 attached to an outer side surface of the tank 11 (see FIG. 3) and operates in cooperation with the operation lever 12 in such a manner that a rotating operation of the operation lever 12 is executed in a direction for executing a predetermined wash mode (for example, wash with a large amount of water).

The wire winding device 70 includes a case 71, a first gear 72, a second gear 73, a swing part 74, and a regulation part 75. The case 71 is arranged on an inner side surface of the tank 11. The first gear 72 is provided in the case 71 and provided so as to be rotatable around a rotation shaft 72*a* that is coaxial with a rotation shaft of the operation lever 12. The second gear 73 is provided so as to be rotatable around a rotation shaft 73*a* and provided so as to be capable of engaging with the first gear 72.

The swing part 74 that is concentric with the second gear 73 and has a circular arc shape is provided outside the second gear 73. The swing part 74 is provided so as to be capable of swinging within a predetermined range along an inner peripheral surface of the case 71. A proximal end of the operation wire 14 is attached to the swing part 74. Due to swinging of the swing part 74, the operation wire 14 moves forward or backward in the tube 13 in a direction of an arrow in the drawing. The regulation part 75 is provided on a proximal end of the operation wire 14 and regulates forward or backward movement of the operation wire 14.

Figure 10:
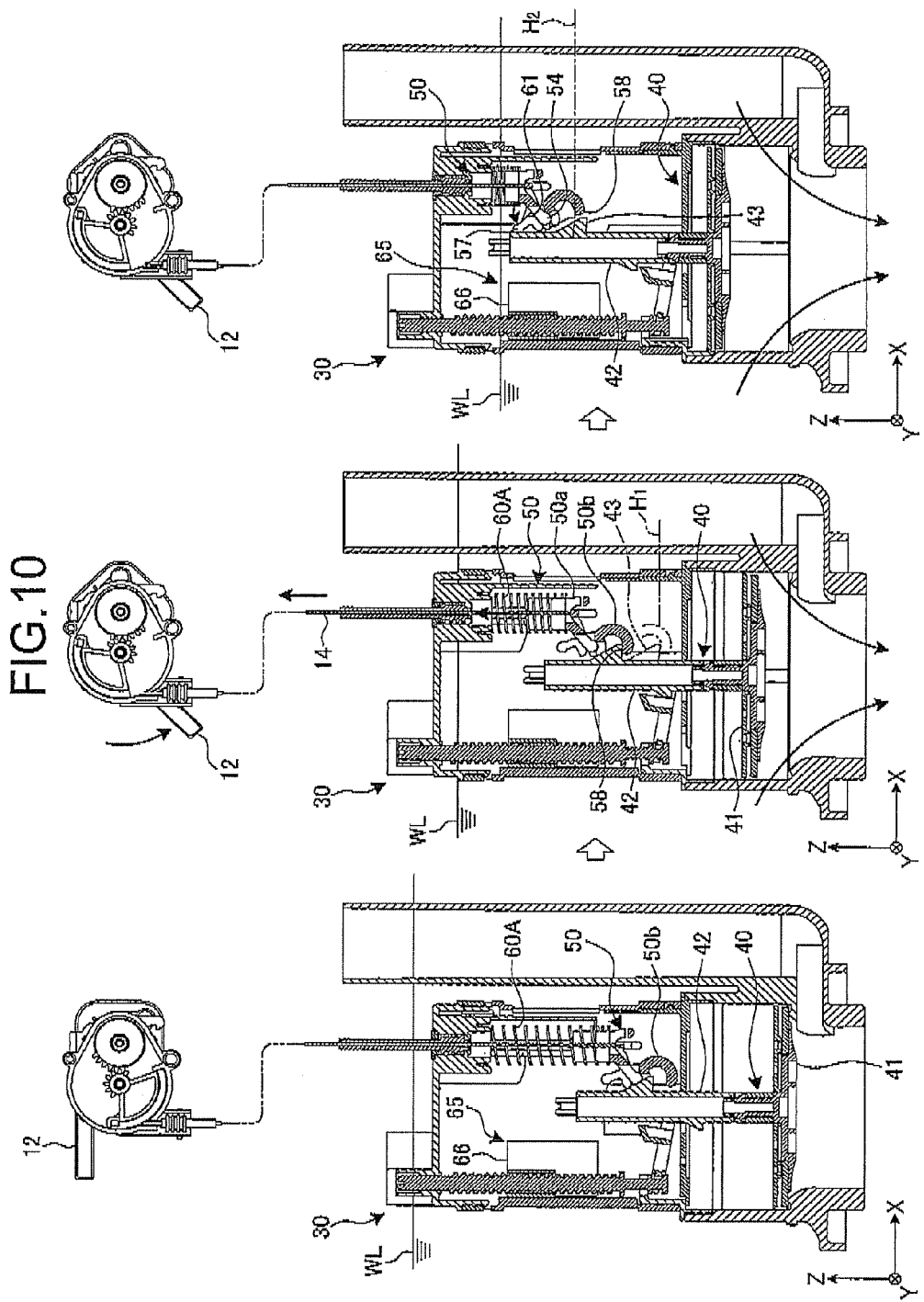
FIG. 10 is a diagram (part 1) illustrating an operation of a drain valve device according to the first embodiment.
Figure 11:
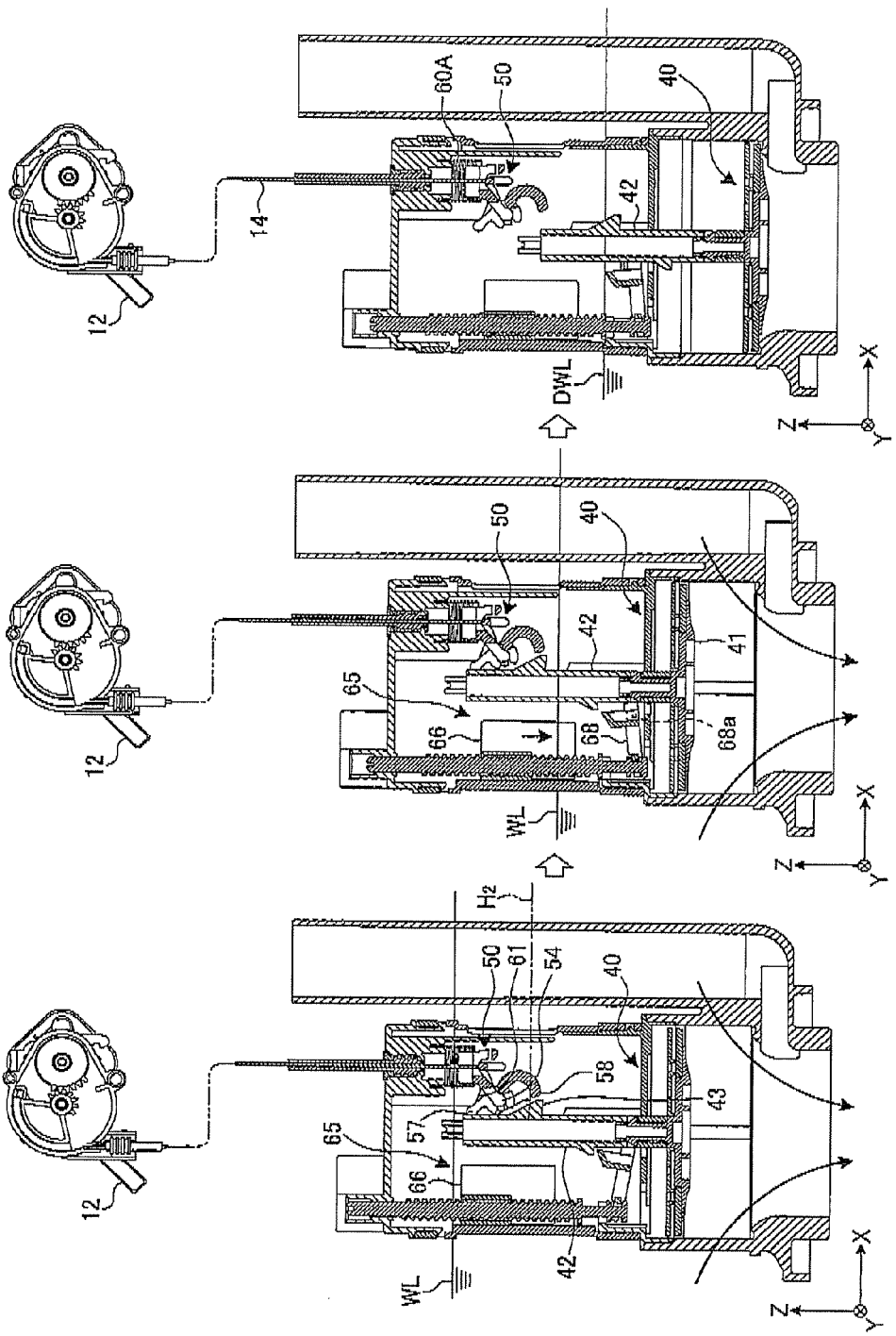
FIG. 11 is a diagram (part 2) illustrating an operation of a drain valve device according to the first embodiment.

Next, an operation of the drain valve device 30 according to the first embodiment will be described with reference to FIG. 10 to FIG. 12. FIG. 10 and FIG. 11 are diagrams illustrating an operation of the drain valve device 30 according to the first embodiment. FIG. 10 and FIG. 11 are diagrams illustrating a sequence of water drainage operations. A view at a right side for illustrating a last operation in FIG. 10 is identical to a view at a left side for illustrating a first operation in FIG. 11, and hence, its descriptions for FIG. 10 will be provided to omit-its descriptions for FIG. 11.

In FIG. 10 and FIG. 11, as the valve body 40 (lid part 41) rises, water is discharged through the drain outlet 15 (see FIG. 3), and hence, wash water in the tank 11 as illustrated in the drawing is reduced gradually. That is, a water level WL in the drawing is lowered gradually.

As illustrated in FIG. 10 (left side), in a state before an operation of the operation lever 12, the drain valve device 30 closes, or plugs with the lid part 41 of the valve body 40, the drain outlet 15 (see FIG. 3). In such a state, the lift part 50 is present at the above-mentioned reference height and the engagement part 50*b* has the above-mentioned reference orientation. Engagement of the shaft part 42 of the valve body 40 with the float 65 is released.

Then, as illustrated in FIG. 10 (middle), as the operation lever 12 is operated, that is, as the operation lever 12 is rotated in a direction of an arrow in the drawing, the operation wire 14 moves backward (rises) in a direction of an arrow in the drawing so that the lift part 50 (straight movement part 50*a* and engagement part 50*b*) rises. The lift part 50 rises against bias force from the bias part 60A in a downward direction.

As the lift part 50 rises, the claw part 58 of the engagement part 50*b* engages with a protrusion (lift part side protrusion) of the shaft part 42 at a first height $H_1$. The lift part 50 further continues to rise, and thereby, the lift part 50*b* lifts the shaft part 42 of the valve body 40. Accordingly, the lid part 41 rises to open the drain outlet 15. Thereby, wash water in the tank 11 is drained through the drain outlet 15.

That is, the valve body 40 starts to rise at the first height $H_1$. Specifically, the first height $H_1$ is a height such that the claw part 58 engages with the lift part side protrusion 43 and the valve body 40 starts to rise due to lifting of the lift part 50.

Then, as illustrated in FIG. 10 (right side), as the lift part 50 rises to a predetermined height, the contact parts 57 of the engagement part 50*b* contact the upper guide 61. The lift part 50 further rises, and at a second height $H_2$, the contact parts 57 move toward a shaft part 42 side of the valve body 40 along a slope of a slide surface of the upper guide 61. As the contact parts 57 move toward a shaft part 42 side, the claw part 58 rotates around the rotation shaft 54 as a center in a direction such that it becomes distant from the shaft part 42. Thereby, engagement of the lift part 50 with the valve body 40 is released so that the valve body 40 is free and the valve body 40 starts to fall due to its own weight or under gravity.

As engagement of the lift part 50 with the valve body 40 is released, the valve body 40 does not depend on an operation of the operation lever 12, so that even when the operation lever 12 remains rotating-operated, the valve body 40 falls independently of such an operation.

That is, the valve body 40 starts to fall at the second height $H_2$. Specifically, the second height $H_2$ is a height such that the claw part 58 releases its engagement with the lift part side protrusion 43 and the valve body 40 starts to fall.

Thus, the valve body 40 starts to rise at the first height $H_1$ and starts to fall at the second height $H_2$, so that the valve body 40 can be moved upward or downward and the drain outlet 15 can be opened or closed according to upward or downward movement of the valve body 40 to drain or stop wash water. The valve body 40 can be lifted from a lower position to a higher position or lowered from a higher position to a lower position.

The valve body 40 that is released from its engagement and falls due to its own weight engages with the float 65 in the middle of falling thereof. The valve body 40 engages with the float 65, and subsequently, the valve body 40 falls according to lowering of the water level WL of wash water in the tank 11 (see FIG. 3).

Then, as illustrated in FIG. 11 (middle), as the valve body 40 and the float 65 (float body 66) fall to a predetermined height due to lowering of the water level WL in the tank 11, an end of the float side engagement part 68 at a shaft part 42 side swings upward around the swing shaft 68*a* as a center. Thereby, engagement of the valve body 40 with the float 65 is released, and subsequently, the valve body 40 falls singly. As mentioned above, a view at a left side of FIG. 11 is identical to a view at a right side of FIG. 10, and hence, descriptions thereof are omitted.

Then, as illustrated in FIG. 11 (right side), as the valve body 40 that falls due to its own weight closes and plugs the drain outlet 15, drainage of wash water through the drain outlet 15 is ended. A water level in the tank 11 at a time when the valve body 40 closes or plugs the drain outlet 15 to end water drainage is referred to as a "dead water level (DWL)".

As a rotating operation of the operation lever 12 is released, the operation wire 14 moves forward again. As the operation wire 14 moves forward, the lift part 50 that has been lifted up against bias force from the bias part 60A falls while being biased by the bias part 60A. Herein, an operation for returning the lift part 50 in a case where the valve body 40 falls prior to the lift part 50 will be described with reference to FIG. 12. FIG. 12 is a diagram illustrating an operation for returning the lift part 50.

For example, as the operation lever 12 remains rotated for a long period of time, the lift part 50 is held at an upper side while only the valve body 40 that has released its engagement with the engagement part 50b of the lift part 50 falls previously. In such a case, the engagement part 50b passes the shaft part 42 to return to an original state (reference orientation).

Figure 12:
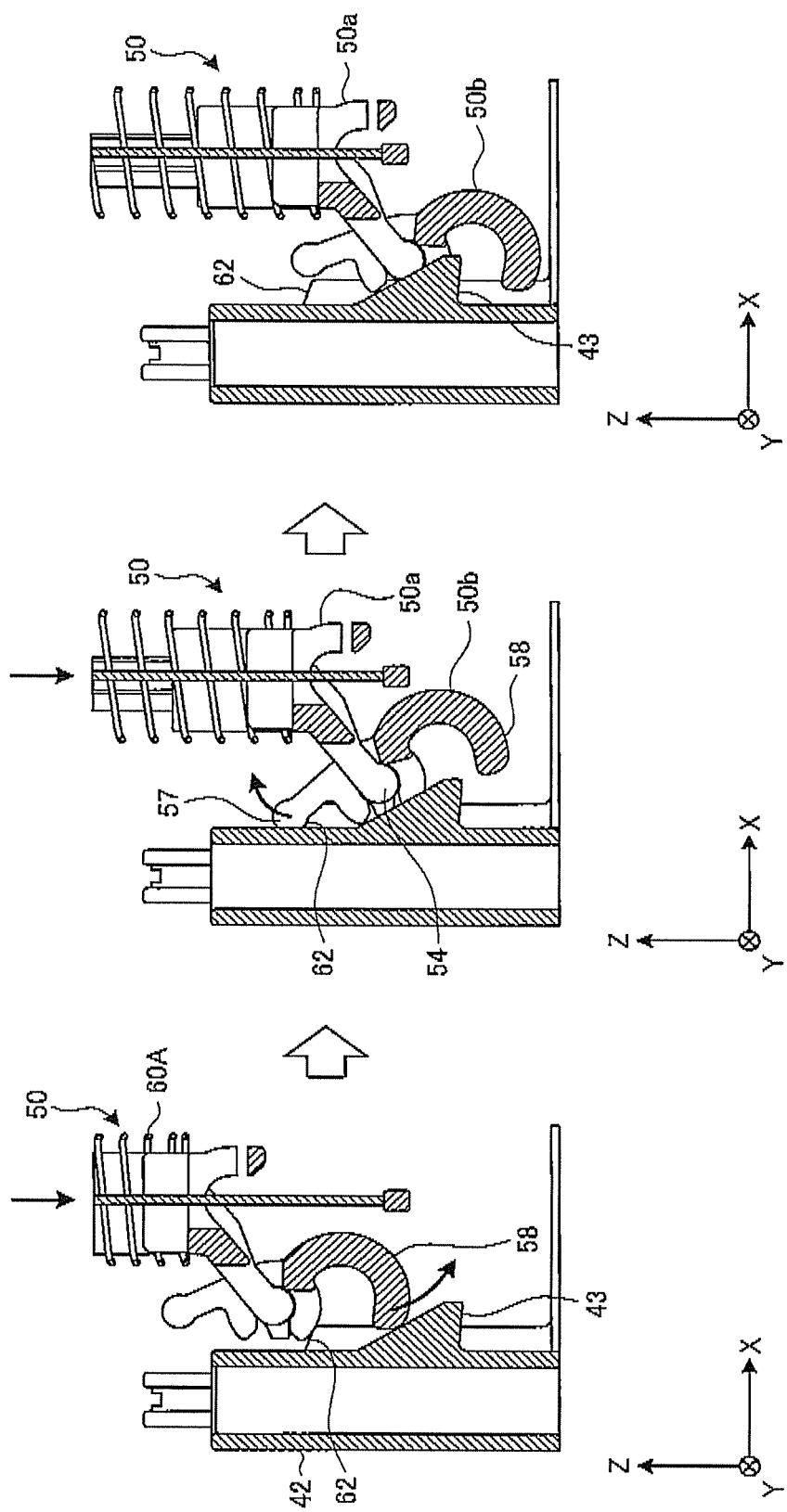
FIG. 12 is a diagram illustrating an operation for returning a lift part.

As illustrated in FIG. 12 (left side), the lift part 50 falls while being biased by the bias part 60A, and the claw part 58 contacts a slide surface of the lower guide 62. As the lift part 50 further falls, the claw part 58 slides on the slide surface of the lower guide 62 and rotates in a direction such that it becomes distant from the shaft part 42, namely, a positive direction of an X-axis. In such a case, the rotation regulating parts 55 contact opening portions of the grip parts 59 so that rotation of the claw part 58 is regulated within a predetermined range. Thereby, needless rotation of the engagement part 50b is suppressed to prevent its orientation from being readily changed, so that a reference orientation can be provided reliably.

As illustrated in FIG. 12 (middle), as the lift part 50 further continues to fall, the contact parts 57 of the engagement part 50b slide on the slide surface of the lower guide 62 to rotate around the rotation shaft 54 of the straight movement part 50a as a center in a positive direction of an X-axis. Accordingly, the claw part 58 rotates in a negative direction of an X-axis.

As illustrated in FIG. 12 (right side), the claw part 58 of the engagement part 50b avoids the lift part side protrusion 43 of the shaft part 42 and is returned to an original or reference orientation. The lift part 50 is returned to an original or reference height.

For example, in a case where the operation lever 12 is rotated for a short period of time or the like, the lift part 50 biased by the bias part 60A may fall previously. In such a case, even when the claw part 58 of the engagement part 50b remains in a state of rotation in a positive direction of an X-axis, it returns to a reference orientation due to the lower guide 62.

Due to the above-mentioned drain valve device 30 according to the first embodiment, the lift part 50 is engaged with the valve body 40 at the first height $H_1$ and engagement of the lift part 50 with the valve body 40 is released at the second height $H_2$, so that the valve body 40 can be moved upward or downward equally in cases including a case where an operation time period for the operation lever 12 or the like is long. That is, the valve body 40 can be moved independently of an operation of the operation lever 12 or the like. Thereby, a period of time when the drain outlet 15 is open can be constant, so that water can be saved independently of an operation time period for the operation lever 12.

Due to the above-mentioned drain valve device 30 according to the first embodiment, the lift part 50 falls to a reference height due to its own weight or under gravity after its engagement with the valve body 40 is released, so that an operation for lifting the valve body 40 by the lift part 50 can be repeated automatically and further engagement of the lift part 50 with the valve body 40 can reliably be attained even when such a lifting operation is executed repeatedly. Herein, the reference height may be a height that allows the engagement part 50b to engage with the valve body 40 at the first height when the valve body 40 is lifted.

Due to the above-mentioned drain valve device 30 according to the first embodiment, after the valve body 40 is released from its engagement with the lift part 50 so as to be free, falling of the valve body 40 is left to the float 65, and thereby, an amount of wash water that is supplied to a toilet can be kept constant regardless of whether an operation time period for the operation lever 12 is long or short.

Due to the above-mentioned drain valve device 30 according to the first embodiment, the base part 56 that contacts the upper guide 61 slides in a direction such that it becomes close to the shaft part 42 and the claw part 58 rotates in a direction such that it becomes distant from the shaft part 42, so that its engagement with the valve body 40 is released and thereby engagement of the lift part 50 with the valve body 40 can be released reliably and at low cost.

Due to the above-mentioned drain valve device 30 according to the first embodiment, the base part 56 contacts the lower guide 62 and thereby the claw part 58 rotates in a direction such that it becomes close to the shaft part 42 of the valve body 40 so as to have a reference orientation, so that the engagement part 50b can reliably be returned to the reference orientation.

Due to the above-mentioned drain valve device 30 according to the first embodiment, the claw part 5e contacts a top surface of the lift part side protrusion 43 and the claw part 58 rotates in a direction such that it becomes distant from the shaft part 42 of the valve body 40 so as to avoid the lift part side protrusion 43, so that the engagement part 50b can reliably avoid the lift part side protrusion 43.

Second Embodiment

Next, a drain valve device 100, a wash water tank device, and a flush toilet according to a second embodiment will be described. The second embodiment is different from the above-mentioned first embodiment in a configuration of the drain valve device 100. Hereinafter, the drain valve device 100 according to the second embodiment will be described with reference to FIG. 13 to FIG. 15.

Figure 13:
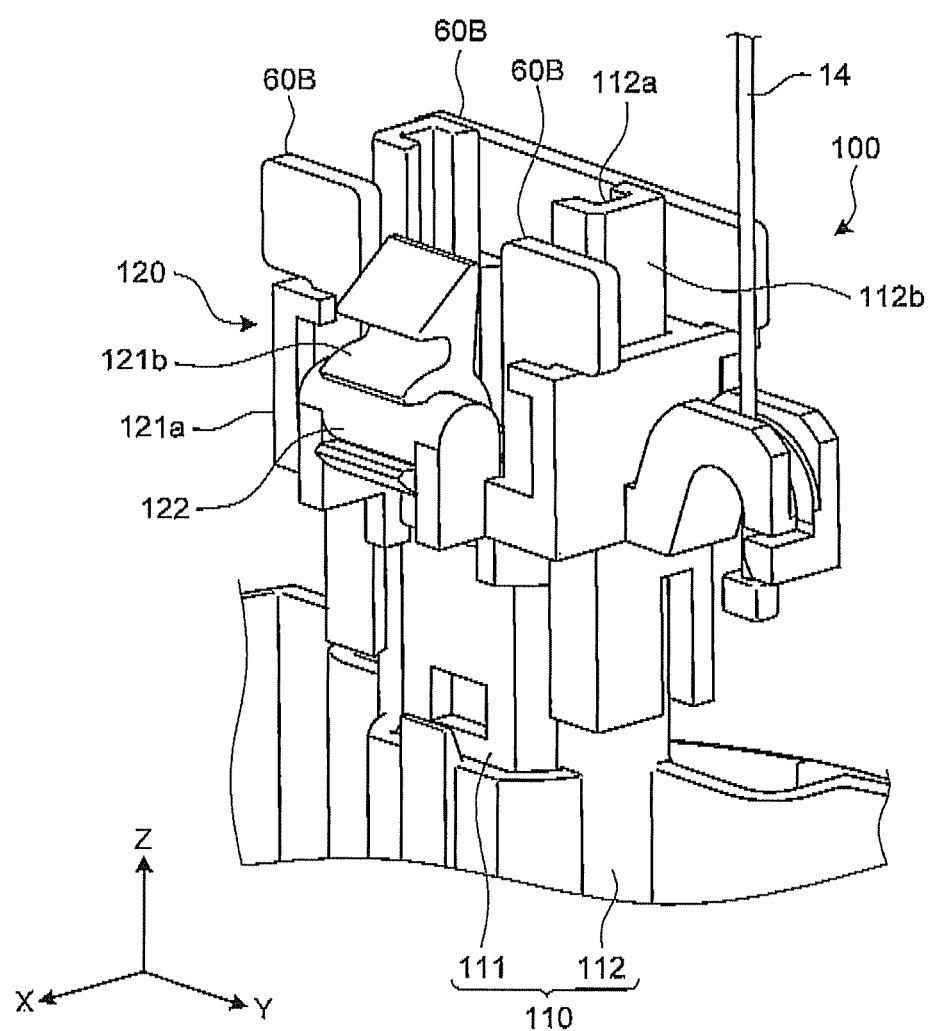
FIG. 13 is a schematic perspective view of a drain valve device according to a second embodiment.
Figure 14:
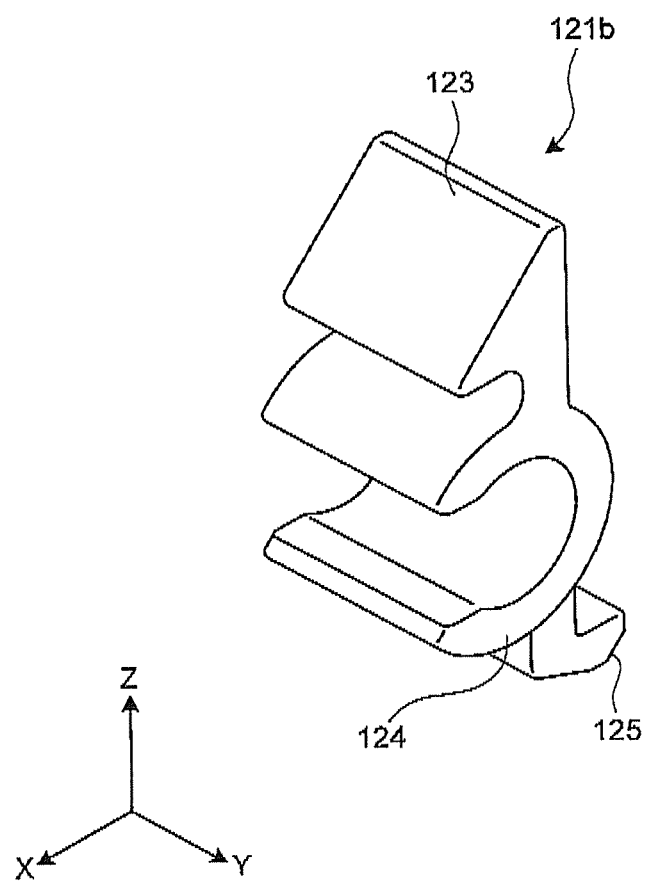
FIG. 14 is a perspective view of an engagement part.

FIG. 13 is a schematic perspective view of the drain valve device 100 according to the second embodiment. FIG. 14 is a perspective view of an engagement part 121b. FIG. 15 is a diagram illustrating an operation of the drain valve device 100 according to the second embodiment. In the drain valve device 100 according to the second embodiment, a part equivalent or identical to that of the above-mentioned drain valve device 30 according to the first embodiment will be provided with an identical reference numeral or letter to omit descriptions thereof.

In the above-mentioned drain valve device 30 according to the first embodiment, the lift part 50 is arranged side by side with the shaft part 42 of the valve body 40. On the other hand, the drain valve device 100 according to the second embodiment is different from the drain valve device 30 in that a lift part 120 is coaxial with a shaft part 110 of a valve body 40.

As illustrated in FIG. 13, the drain valve device 100 according to the second embodiment includes a first shaft part 111 and a second shaft part 112 as the shaft part 110 that moves the valve body 40 (see FIG. 15) upward or downward. The first shaft part 111 is a substantially rectangular shaft and is coupled with a lid part 41 (see FIG. 15) on a bottom thereof. The second shaft part 112 is provided outside the first shaft part 111 along an inner guide 112a and slides the first shaft part 111 in an upward or downward direction (direction of a Z-axis) inside thereof. The second shaft part 112 is provided substantially integrally with a body 31.

The drain valve device 100 includes the lift part 120. The lift part 120 includes a straight movement part 121a and the engagement part 121b. The straight movement part 121a is provided outside the second shaft part 112 and provided so as to be movable upward or downward along an outer guide 112*b* of the second shaft part 112. An operation wire 14 is connected to the straight movement part 121*a*.

The engagement part 121*b* is provided rotatably with respect to the straight movement part 121*a* while a rotation shaft 122 provided on the straight movement part 121*a* and directed in a direction of a Y-axis is a rotation center. A shape of the engagement part 121*b* will be described later by using FIG. 14.

The drain valve device 100 includes a weight as a weight part 60B. For a weight as the weight part 60B, for example, a single or plurality of metal pieces are employed. The weight part 605 is attached thereto, and thereby, an own weight of the lift part 120 can be greater than its buoyancy in wash water, so that the lift part 120 can reliably be lowered even when a sliding resistance or the like is caused at a time of falling of the lift part 120.

Herein, the engagement part 121*b* will be described with reference to FIG. 14. As illustrated in FIG. 14, the engagement part 121*b* includes a contact part 123, a grip part 124, and a claw part 125. The contact part 123 has a slide surface with a downward slope that is lower, as it becomes distant from the shaft part 110, that is, it becomes close to a positive direction of an X-axis. The grip part 124 that is attached to the rotation shaft 122 (see FIG. 13) rotatably within a predetermined range is provided at a middle position of the engagement part 121*b* in upward and downward directions (directions of a Z-axis). The claw part 125 that protrudes in a direction such that it becomes close to the shaft part 110 is provided on a lower end of the shaft part 110.

The claw part 125 protrudes toward the shaft part 110 in a reference orientation thereof and is provided to be capable of being inserted through an engagement hole 126 (see FIG. 15) provided on the first shaft part 111. The claw part 125 is inserted through the engagement hole 126 of the first shaft part 111, and thereby, the engagement part 121*b* can be engaged with the first shaft part 111.

The claw part 125 in a state where it is supported by the straight movement part 121*a* has a center of gravity at a position where it has a reference orientation such that the claw part 125 is present under the rotation shaft 122 and at the first shaft part 111 side with respect to the engagement hole 126 of the first shaft part 111, similarly to the above-mentioned claw part 58 of the engagement part 50*b*. Rotation of the engagement part 121*b* is regulated so as to be rotatable within a predetermined range.

Thus, the engagement part 121*b* in a state where it is supported by the straight movement part 121*a* has a center of gravity at a position where the claw part 125 has the above-mentioned reference orientation, and thereby, the engagement part 121*b* can reliably be engaged with the first shaft part 111 of the valve body 40.

Next, an operation of the drain valve device 100 according to the second embodiment will be described with reference to FIG. 15. FIG. 15 is a diagram illustrating an operation of the drain valve device 100 according to the second embodiment.

In FIG. 15, similarly to FIG. 10 and FIG. 11, as the valve body 40 (lid part 41) rises, water is discharged through the drain outlet 15 (see FIG. 3), and hence, wash water in the tank 11 illustrated in the drawing is gradually reduced. That is, a water level WL in the drawing is gradually lowered.

As illustrated in FIG. 15 (left side), the drain valve-device 100 in a state before an operation of an operation lever 12 (see FIG. 10) closes, or plugs with the lid part 41 of the valve body 40, the drain outlet 15 (see FIG. 3). In such a state, the lift part 120 is present at the above-mentioned reference height and the engagement part 121*b* has the above-mentioned reference orientation. In the drain valve device 100 in a state where the reference height is the first height $H_1$ and the lid part 41 closes or plugs the drain outlet 15, the engagement part 121*b* is engaged with the valve body 40, specifically, the first shaft part 111.

Then, as illustrated in FIG. 15 (middle), the operation lever 12 is operated in such a manner that the operation wire 14 moves backward (rises) in a direction of an arrow in the drawing and the lift part 120 (straight movement part 121*a* and engagement part 121*b*) rises. The lift part 120 rises against a load of the weight part 60B.

As the lift part 120 rises, the lid part 41 rises accordingly, so that the drain outlet 15 is opened. Thereby, wash water in the tank 11 is drained through the drain outlet 15.

As the lift part 120 rises to a predetermined height, the contact part 123 of the engagement part 121*b* contacts the upper guide 61. The lift part 120 further rises, and at the second height $H_2$, the contact part 123 moves to a first shaft part 111 side of the valve body 40 along a slope of a slide surface of the upper guide 61. As the contact part 123 moves to the first shaft part 111 side, the claw part 125 rotates around the rotation shaft 122 as a center in a direction such that it becomes distant from the first shaft part 111, that is, an opposite direction. Thereby, engagement of the lift part 120 with the first shaft part 111 of the valve body 40 is released, so that the first shaft part 111 is free from the second shaft part 112 with the lift part 120 attached thereto and starts to fall in a state where a load of the weight part 60B is added to its own weight.

In the second embodiment, similarly to the above-mentioned first embodiment, the first height $H_1$ is a height such that the claw part 125 engages with the engagement hole 126 and the valve body 40 starts to rise due to lifting of the lift part 120. The second height $H_2$ is a height such that the claw part 125 detaches from the engagement hole 126 to release its engagement with the engagement hole 126 and the valve body 40 starts to fall.

Engagement of the lift part 120 with the valve body 40 (first shaft part 111) is released, so that the first shaft part 111 of the valve body 40 does not depend on an operation and the first shaft part 111 falls independently of such an operation even in a state where the operation lever 12 (see FIG. 3) remains rotating-operated.

The first shaft part 111 of the valve body 40 that has released its engagement to fall due to its own weight or under gravity engages with the float 65 in the middle of falling thereof, similarly to the above-mentioned drain valve device 30 according to the first embodiment. The first shaft part 111 engages with the float 65, and subsequently, the first shaft part 111 falls according to lowering of the water level WL of wash water in the tank 11 (see FIG. 3).

Then, as the valve body 40 (first shaft part 111) and the float 65 (float body 66) fall to a predetermined height due to lowering of the water level WL in the tank 11, an end of the float side engagement part 68 at a first shaft part 111 side swings upward around the swing shaft 68*a* as a center. Thereby, engagement of the first shaft part 111 with the float 65 is released, and subsequently, the first shaft part 111 falls singly.

As illustrated in FIG. 15 (right side), as the lid part 41 of the falling valve body 40 closes or plugs the drain outlet 15, drainage of wash water through the drain outlet 15 is ended. The claw part 125 of the engagement part 121*b* engages with the engagement hole 126 of the first shaft part 111 and returns to an original or reference orientation, and further, the lift part 120 returns to an original or reference height.

Due to the above-mentioned drain valve device 100 according to the second embodiment, the claw part 125 of the lift part 120 is engaged with the engagement hole 126 of the first shaft part 111 of the valve body 40 at the first height (reference height) $H_1$ and engagement of the claw part 125 with the engagement hole 126 is released at the second height $H_2$. Hence, the valve body 40 can be moved upward or downward equally in cases including a case where an operation time period for the operation lever 12 or the like is long. That is, the valve body 40 can be moved without depending on an operation for the operation lever 12 or the like. Thereby, a period of time when the drain outlet 15 is open can be constant, and water can be saved independently of an operation time period for the operation lever 12.

Due to the above-mentioned drain valve device 100 according to the second embodiment, the lift part 120 (claw part 125) releases its engagement with the valve body 40 (engagement hole 126 of the first shaft part 111), and subsequently, falls to a reference height while a load of the weight part 60B and its own weight are applied thereto. Thereby, an operation for lifting the first shaft part 111 can be repeated automatically, and further, engagement of the claw part 125 with the engagement hole 126 can reliably be executed even when such a lifting operation is repeated.

Due to the above-mentioned drain valve device 100 according to the second embodiment, the first shaft part 111 releases its engagement with the claw part 125 so as to be free, and subsequently, falling of the first shaft part 111 is left to the float 65, so that an amount of wash water that is supplied to a toilet can be kept constant regardless of whether an operation time period for the operation lever 12 is long or short.

Due to the above-mentioned drain valve device 100 according to the second embodiment, the contact part 123 of the base part 56 that contacts the upper guide 61 slides in a direction such that it becomes close to the first shaft part ill, and the claw part 125 rotates in a direction such that it becomes distant from the first shaft part 111, so that its engagement with the engagement hole 126 is released, and thereby, engagement of the claw part 125 with the engagement hole 126 can be released reliably and at low cost.

The lift part 120 is arranged coaxially with the first shaft part 111 and the second shaft part 112, so that an occupied area in a top view (view in a-negative direction of a Z-axis) can be reduced. Thereby, the drain valve device 100 can be compact.

Due to the wash water tank device 10 according to the above-mentioned embodiment, water can be saved independently of an operation time period for the operation lever 12 or the like.

Due to the flush toilet 1 according to the above-mentioned embodiment, water can be saved independently of an operation time period for the operation lever 12 or the like.

Although the drain valve devices 30, 100 according to the above-mentioned embodiments are configured in such a manner that the claw parts 58, 125 of the engagement parts 50b, 121b are mechanically engaged, respectively, a configuration may be provided so as to execute engagement by using, for example, magnetic force or the like. Thus, magnetic force or the like is utilized, and thereby, a mistake in mechanical engagement is prevented from being caused.

The drain valve devices 30, 100 according to the above-mentioned embodiments are configured in such a manner that the valve bodies 40 include the shaft parts 42, 110 and the lift parts 50, 120 include the engagement parts 50b, 121b that engage with the shaft parts 42, 110, respectively. However, they are not limited thereto but may be configured, for example, in such a manner that the engagement parts 50b, 121b directly engage with the lid parts 41. As mentioned above, engagement does not only refer to a case where both of them are hooked by each other.

Although the drain valve devices 30, 100 according to the above-mentioned embodiments are configured in such a manner that the valve body 40 is moved upward or downward by using the operation-wire 14 with a high degree of freedom for arrangement thereof, they are not limited thereto but may be configured, for example, in such a manner that the valve body 40 is moved upward or downward by using a spindle that is connected to a string body such as a ball chain.

According to an aspect of the embodiment, water can be saved independently of an operation time period.

The drain valve device according to the embodiment includes the valve body and the lift part. The valve body plugs the drain outlet arranged on the bottom surface of the wash water tank that stores wash water that washes the toilet. The lift part is to lift the valve body. The lift part includes the engagement part. The engagement part engages with the valve body at the first height and releases its engagement with the valve body at the second height that is greater than the first height.

The lift part is engaged with the valve body at the first height and engagement of the lift part with the valve body is released at the second height, so that the valve body can be moved upward or downward equally in cases including, for example, a case where the operation time period for the operation lever is long. That is, the valve body can be moved without depending on the operation of the operation lever. Thereby, a period of time when the drain outlet is open can be constant and water can be saved independently of the operation time period.

The valve body starts to rise at the first height and starts to fall at the second height. Thereby, the valve body can be moved upward or downward. The drain outlet is opened or closed according to upward or downward movement of the valve body, so that wash water can be drained or stopped.

The lift part falls, due to its own weight, to the reference height such that after its engagement with the valve body is released, the engagement part is capable of engaging with the valve body at the first height. Thereby, the operation for lifting the valve body by the lift part can be repeated automatically, and further, the lift part can reliably be engaged with the valve body even when such the lifting operation is repeated.

The bias part that biases the lift part in the downward direction. Thereby, the lift part can reliably be lowered even when the sliding resistance or the like is caused at time of falling of the lift part. The lift part includes the weight part that causes its own weight to be greater than its buoyancy in the wash water. The weight part may have a weight greater than buoyancy of the weight part. Even in such the configuration, the lift part can reliably be lowered against the sliding resistance or the like.

The float that moves upward or downward depending on the water level of the wash water in the tank, wherein the valve body falls due to its own weight to engage with the float after its engagement with the engagement part is released. Thus, after its engagement with the lift part is released in such the manner that the valve body is free, falling of the valve body is left to the float, and thereby, the amount of wash water that is supplied to a toilet can be kept constant regardless of whether the operation time period is long or short.

The lid part that plugs the drain outlet; and the shaft part that extends upward from the lid part and has the diameter less than that of the lid part and the protrusion on the peripheral surface thereof, wherein the lift part is arranged side by side with the shaft part in the top view and the engagement part engages with the protrusion of the shaft part. Thus, the lift part is arranged side by side with the shaft part of the valve body, and thereby, for example, the additional mechanism that acts on the lift part such as the bias part that biases the lift part can readily be arranged.

The straight movement part that rotatably supports the engagement part around the rotation shaft in the horizontal direction and is straight movable in upward and downward directions, wherein the engagement part is such that the hook-shaped claw part and the bar-shaped base part are formed on one end and another end thereof, respectively, in the view along the rotation shaft, and in the state where it is supported by the straight movement part between the claw part and the base part, its center of gravity is present at the position such that it has the reference orientation where the claw part is present under the rotation shaft and closer to the shaft part than the tip of the protrusion of the shaft part. By such a configuration, the engagement part can reliably engaged with the shaft part of the valve body.

The upper guide with the downward slope that protrudes downward from the top surface side and is lower as it becomes distant from the shaft part of the valve body, wherein the engagement part is such that, as the lift part is lifted, for example, to the second height, the base part that contacts the upper guide slides thereon in the direction such that it becomes close or moves closer to the shaft part of the valve body, and thereby, the claw part rotates in the direction such that it becomes distant or moves away from the shaft part, so that its engagement with the valve body is released at the second height. The engagement part may be rotated. By such a configuration, engagement of the lift part with the valve body can be released reliably and at low cost.

The lower guide that protrudes upward from the bottom surface side or a bottom surface of a body of the drain valve device, wherein the engagement part is such that, as the lift part falls, the base part contacts the lower guide and thereby the claw part rotates in the direction such that it becomes close or moves closer to the shaft part of the valve body, so that it has the reference orientation. The engagement part may be rotated. By such a configuration, the engagement part can reliably be returned to the reference orientation thereof.

The top surface of the protrusion of the shaft part has the downward slope that is lower as it becomes close to the tip thereof, and the engagement part is such that, as the lift part falls, the claw part contacts the top surface of the protrusion and thereby the claw part rotates in the direction such that it becomes distant or moves away from the shaft part of the valve body, so that the protrusion is avoided or the claw part is away from the protrusion. The protrusion of the shaft part may have a sloped surface that starts from an upper end of the protrusion and ends at a lower end of the protrusion, wherein the upper end is closer to the axis of the shaft part than the lower end. The engagement part may be rotated. By such a configuration, the engagement part can reliably avoid the protrusion of the shaft part.

The first height is the height where the claw part of the engagement part engages with the protrusion of the shaft part and the valve body starts to rise, and the second height is the height where the claw part of the engagement part releases its engagement with the protrusion of the shaft part and the valve body starts to fall. By such a configuration, specifically, the valve body can be lifted from the lower position to the higher position or lowered from the higher position to the lower position.

The wash water tank device according to the embodiment includes the drain valve device and the tank. Thereby, water can be saved independently of the operation time period.

The flush toilet according to the embodiment includes the wash water tank device and the toilet. Thereby, water can be saved independently of the operation time period.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A drain valve device comprising:
   a valve body that plugs a drain outlet arranged on a bottom surface of a tank; and
   a lift part that is configured to lift the valve body,
   wherein the lift part includes an engagement part that engages with the valve body at a first height and releases engagement of the engagement part with the valve body independent of an operation lever when the lift part arrives at a second height at which the valve body is predetermined to start to fall, the second height being greater than the first height.

2. The drain valve device according to claim 1, wherein the valve body starts to rise at the first height and starts to fall at the second height.

3. The drain valve device according to claim 1, wherein the lift part falls under gravity to a reference height after engagement of the engagement part with the valve body is released, the reference height being a height that allows the engagement part to engage with the valve body at the first height when the valve body is lifted.

4. The drain valve device according to claim 1, comprising
   a bias member that biases the lift part in a downward direction.

5. The drain valve device according to claim 1, wherein the lift part includes a weight part, the weight part having a weight greater than buoyancy of the weight part.

6. The drain valve device according to claim 1, comprising
   a float that moves upward or downward depending on a water level of the wash water in the tank,
   wherein the valve body falls under gravity to engage with the float after engagement of the valve body with the engagement part is released.

7. The drain valve device according to claim 1, wherein the valve body includes:
   a lid part that plugs the drain outlet; and
   a shaft part that extends upward from the lid part, has a diameter less than that of the lid part, and has a protrusion on a surface of the shaft part,
   wherein the lift part is arranged side by side with the shaft part in a top view and the engagement part engages with the protrusion of the shaft part.

8. The drain valve device according to claim 7, wherein the lift part includes
   a straight movement part that has rotation shafts with a horizontal axis and supports the engagement part with the rotation shafts, the engagement part being rotatable around the rotation shafts of the straight movement part, the straight movement part being straight movable in upward and downward directions, wherein the engagement part has a hook-shaped claw part at one end of the engagement part and a bar-shaped base part at the other end of the engagement part, the engagement part is supported by the straight movement part at positions of grip parts between the claw part and the base part, and the engagement part has a reference orientation wherein the engagement part has a gravity center such that a distal end of the claw part of the engagement part is closer to an axis of the shaft part than a tip of the protrusion of the shaft part.

9. The drain valve device according to claim 8, comprising
an upper guide that protrudes downward from a top surface of the drain valve device, the upper guide having an end face that is sloped, the sloped end face being constructed such that an outer end of the sloped end face with respect to an axis of the shaft part of the valve body is lower than an inner end of the sloped end face with respect to an axis of the shaft part of the valve body,
wherein the engagement part is constructed such that, as the lift part is lifted to the second height, the base part contacts and slides on the upper guide, the base part moves closer to the shaft part of the valve body, and the engagement part is rotated, and thereby, the claw part moves away from the shaft part, resulting in that the engagement of the engagement part with the valve body is released at the second height.

10. The drain valve device according to claim 8, comprising
a lower guide that protrudes upward from a bottom surface of a body of the drain valve device,
wherein the engagement part is constructed such that, as the lift part falls, the base part contacts the lower guide and the engagement part is rotated, and thereby the claw part moves closer to the shaft part of the valve body, resulting in that the engagement part has the reference orientation.

11. The drain valve device according to claim 8, wherein the protrusion of the shaft part has a sloped surface that starts from an upper end of the protrusion and ends at a lower end of the protrusion, the upper end being closer to the axis of the shaft part than the lower end, and the engagement part is constructed such that, as the lift part falls, the claw part contacts the protrusion and the engagement part is rotated, and thereby the claw part moves away from the shaft part of the valve body, resulting in that the claw part is away from the protrusion.

12. The drain valve device according to claim 8, wherein the first height is a height when the claw part of the engagement part engages with the protrusion of the shaft part and the valve body starts to rise, and the second height is a height when the engagement of the claw part of the engagement part with the protrusion of the shaft part is released and the valve body starts to fall.

13. A wash water tank device comprising:
the drain valve device according to claim 1; and
the tank.

14. A flush toilet comprising:
the wash water tank device according to claim 13; and
the toilet.

* * * * *